(12) United States Patent
Sekimukai et al.

(10) Patent No.: US 8,483,648 B2
(45) Date of Patent: Jul. 9, 2013

(54) MOBILE STATION (75) Inventors: Kenichi Sekimukai, Hamura (JP);
Yoshiyuki Oshida, Hamura (JP)

(73) Assignee: Hitachi Kokusai Electric Inc., Tokyo (JP)

( * ) Notice: Subject to any disclaimer, the term of this patent is extended or adjusted under 35 U.S.C. 154(b) by 336 days.

(21) Appl. No.: 12/855,892

(22) Filed: Aug. 13, 2010

(65) Prior Publication Data

US 2011/0053540 A1  Mar. 3, 2011

(30) Foreign Application Priority Data

Sep. 3, 2009 (JP) ................. 2009-203430

(51) Int. Cl.
*H04B 1/16* (2006.01)
*H04B 1/38* (2006.01)

(52) U.S. Cl.
USPC .................. 455/343.1; 455/574; 370/311

(58) Field of Classification Search
USPC .. 455/230, 343.1, 574, 334.1, 334.2; 370/311
See application file for complete search history.

(56) References Cited

U.S. PATENT DOCUMENTS

| | | | | |
|---|---|---|---|---|
| 5,815,819 | A * | 9/1998 | Ohta et al. | 455/574 |
| 6,567,384 | B1 * | 5/2003 | Shimbo | 370/311 |
| 7,899,435 | B2 * | 3/2011 | Yano | 455/343.3 |
| 8,004,996 | B2 * | 8/2011 | Nakamura et al. | 455/343.1 |
| 2006/0014537 | A1 | 1/2006 | Arai et al. | |

FOREIGN PATENT DOCUMENTS

| | | |
|---|---|---|
| JP | 11-317678 A | 11/1999 |
| JP | 2002-368673 A | 12/2002 |
| JP | 2005-115901 A | 4/2005 |
| JP | 2006-013594 A | 1/2006 |

* cited by examiner

*Primary Examiner* — Quochien B Vuong
(74) *Attorney, Agent, or Firm* — Mattingly & Malur, PC

(57) ABSTRACT

The present invention provides a mobile station which can reduce the power consumption of an operation of intermittent reception in accordance with an elapsed time after transmission or reception.

When a mobile station intermittently receives signals from another mobile station after transmission or reception, the interval of intermittent reception is not made constant, but the interval of the intermittent reception is made short immediately after transmission or reception, and as the time passes thereafter, the interval of the intermittent reception is made longer than that immediately after transmission or reception. Further, when the interval of the intermittent reception is made long and becomes a predetermined interval, the interval of the intermittent reception can be maintained at the predetermined interval and made constant thereafter.

Accordingly, the interval of a reception timing can be set in accordance with a state after completion of reception or completion of transmission.

9 Claims, 9 Drawing Sheets

MOBILE STATION

BACKGROUND OF THE INVENTION (1) Field of the Invention

The present invention relates to a mobile station to which electric power is supplied by a battery and in which reduction in power consumption is required. The present invention particularly relates to a mobile station which reduces the power consumption of an operation of intermittent reception for intermittently receiving signals in a standby state.

(2) Description of the Related Art

In order to prolong a continuous calling time and a standby time, the low power consumption of a transmission/reception unit has been required from the past in a mobile station or the like of a mobile communication system. Therefore, there has been employed an intermittent reception system for intermittently receiving signals from a base station and the like in a standby state. The power consumption of the mobile station using the intermittent reception system can be reduced by halting the transmission/reception unit in a period other than a reception timing.

Japanese Patent Application Laid-Open No. 2002-368673 discloses that a high-resolution AD converter and a low-resolution AD converter are prepared as AD converters for converting a reception signal from an analog format to a digital format in a mobile terminal of a digital mobile communication system, and the power consumption is reduced by using the high-resolution AD converter and the low-resolution AD converter in a switchable manner on the basis of a current reception level and changes in reception level calculated by comparing the current reception level with a past reception level.

Further, Japanese Patent Application Laid-Open No. H11-317678 discloses that the state of radio waves in a mobile receiver is discriminated to set the mobile receiver at a continuous reception state in an intense electric field, to set the mobile receiver at an intermittent reception state in which a pause time and period is short in a weak electric field, and to set the mobile receiver at an intermittent reception state in which a pause time and period is long in no electric field in order to continuously receive signals, and power-saving effect can be obtained.

For example, when making a call to another mobile station, especially, when making a one-to-one call, there is a high possibility of receiving from the counterpart immediately after transmission. As the time passes after transmission, the possibility of receiving from the counterpart becomes low in many cases. This is because response information for transmission information is returned from the counterpart in many cases.

Further, immediately after receiving from another mobile station, there is a high possibility of receiving from the another mobile station or other mobile stations. As the time passes after reception, the possibility of receiving from the another mobile station becomes low in many cases. This is because additional information for transmission information from the another mobile station is transmitted from the another mobile station, or response information is returned from the other mobile stations in many cases.

In the past, the interval of intermittent reception was not changed in accordance with an elapsed time after completion of transmission or completion of reception. Even if an elapsed time after completion of transmission or completion of reception became considerably long, the efficiency of power consumption was poor due to a short interval of intermittent reception.

There is no description on intermittent reception of a mobile receiver in Japanese Patent Application Laid-Open No. 2002-368673. Further, Japanese Patent Application Laid-Open No. H11-317678 discloses intermittent reception of a mobile receiver in accordance with the state of radio waves, but does not disclose to perform intermittent reception in accordance with an elapsed time after transmission or reception by a mobile station.

An object of the present invention is to provide a mobile station which reduces the power consumption of an operation of intermittent reception in accordance with an elapsed time after transmission or reception.

SUMMARY OF THE INVENTION

In order to solve the above-described problem, when intermittently receiving signals from another mobile station after transmission or reception, the interval of intermittent reception is not always made constant, but the interval of the intermittent reception is made short immediately after transmission or reception, and as the time passes thereafter, the interval of the intermittent reception is made longer than that immediately after transmission or reception in the present invention. Further, as an additional embodiment of the present invention, when the interval of the intermittent reception becomes a predetermined interval, the interval of the intermittent reception can be made constant thereafter.

The representative configuration of the present invention is as follows.

A mobile station including: a reception unit which receives a voice signal or a data signal transmitted from the outside; a transmission unit which transmits a voice signal or a data signal to the outside; and an intermittent reception timing generating unit which intermittently generates a receivable reception timing, wherein the intermittent reception timing generating unit includes: a timer unit which measures an elapsed time after completion of reception or completion of transmission; a reception interval changing unit which changes the interval of the receivable reception timing on the basis of the elapsed time measured by the timer unit; and a reception timing generating unit which generates a reception timing on the basis of the interval changed by the reception interval changing unit, and the reception interval changing unit makes the interval of the reception timing long when the elapsed time measured by the timer unit exceeds a first time.

It should be noted that a mobile receiver can be configured by eliminating the function of the transmission unit in the above-described configuration.

According to the present invention, the interval of a reception timing can be set in accordance with a state after completion of reception and completion of transmission, and the power consumption of a mobile station can be reduced while preventing interference with reception.

DETAILED DESCRIPTION OF THE EMBODIMENT

A mobile station 1 according to an embodiment is operated as follows. A reception timing is gradually changed from a short interval to a long interval after completion of reception or completion of transmission. When a predetermined time passes after completion of reception or completion of transmission, the degree of making the interval of the reception timing long is increased, and when the interval of the reception timing reaches a predetermined interval, the interval of the reception timing is maintained.

Hereinafter, an embodiment of the present invention will be described with reference to the drawings.

(Configuration Example of a Mobile Transmitter/Receiver 1)

Figure 1:
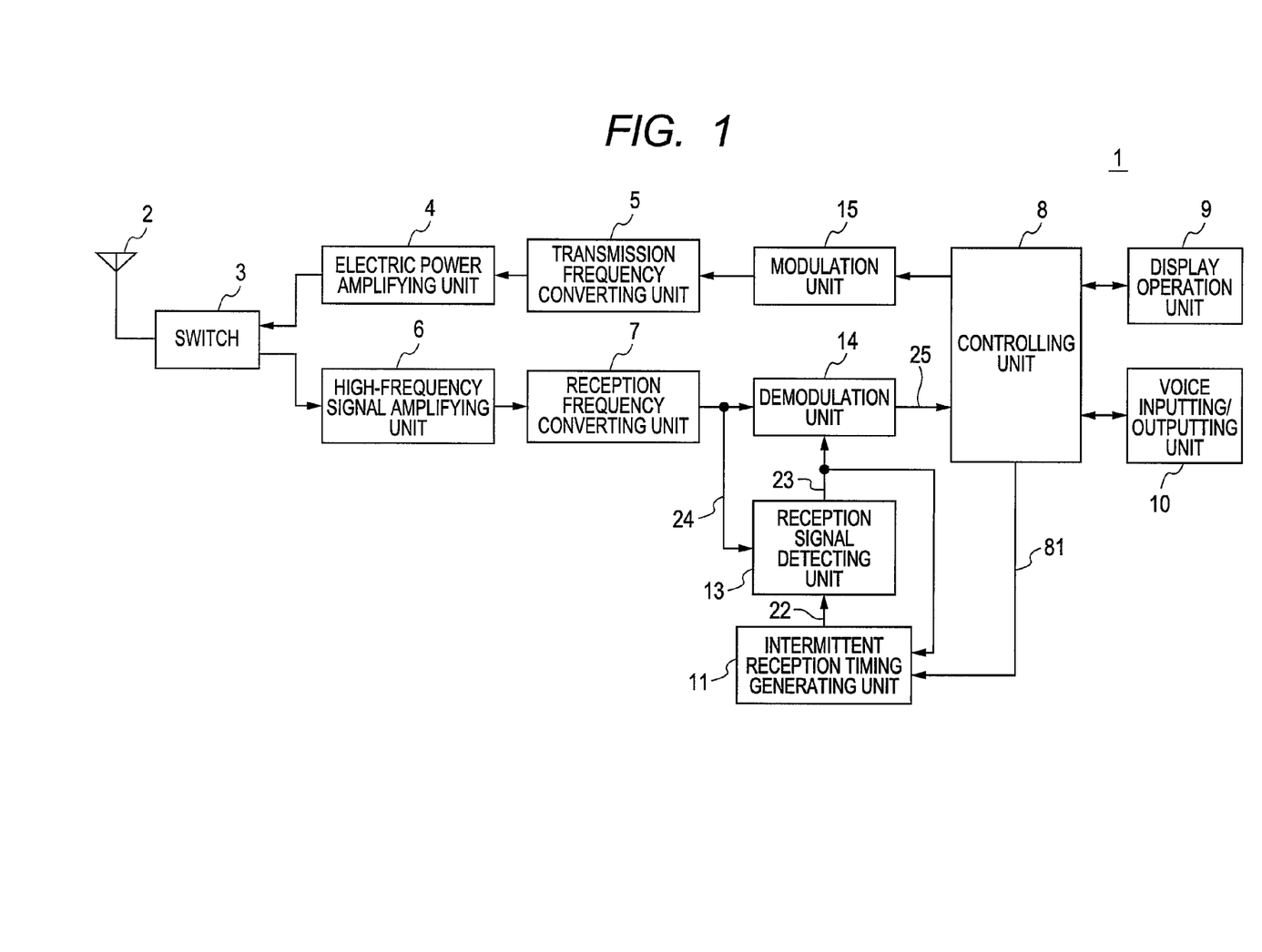
FIG. 1 is a diagram for showing a configuration example of a mobile station of the present invention.

FIG. 1 is a diagram for showing a configuration example of a mobile transmitter/receiver 1 according to the present invention. In FIG. 1, the reference numeral 2 denotes an antenna for transmitting and receiving a radio signal to/from another mobile transmitter/receiver. The reference numeral 3 denotes an antenna switch or a shared device for switching and coupling the antenna between transmission and reception. The reference numeral 10 denotes a voice inputting/outputting unit including a microphone to which voice is input and a speaker for outputting a voice signal as voice.

The reference numeral 8 denotes a controlling unit for performing a voice amplifying process of the voice input from the microphone and processes such as conversion of a demodulation signal into a voice signal and voice amplification. That is, the controlling unit 8 processes a baseband signal that is a signal before modulation (signal to a transmission unit to be described later) or a signal after demodulation (signal from a reception unit to be described later). The reference numeral 15 denotes a modulation unit for performing a modulation process of a transmission signal. The reference numeral 5 denotes a transmission frequency converting unit for converting a modulation signal into a high-frequency signal. The reference numeral 4 denotes an electric power amplifying unit for amplifying the electric power of the high-frequency signal. The modulation unit 15, the transmission frequency converting unit 5, the electric power amplifying unit 4, and the like configure the transmission unit.

The reference numeral 6 denotes a high-frequency signal amplifying unit for amplifying a received high-frequency signal. The reference numeral 7 denotes a reception frequency converting unit for converting the high-frequency signal into an intermediate frequency signal (IF). The reference numeral 14 denotes a demodulation unit for demodulating the intermediate frequency signal. The reference numeral 9 denotes a display operation unit for displaying character data and the like in accordance with control by a user interface and for accepting an input by an operator. The display operation unit includes a display unit and an operation unit. The high-frequency signal amplifying unit 6, the reception frequency converting unit 7, the demodulation unit 14, and the like configure a reception unit.

The reference numeral 11 denotes an intermittent reception timing generating unit for generating an intermittent reception timing signal. In the embodiment, the intermittent reception timing generating unit 11 gradually changes a reception timing from a short interval to a long interval. When the reception timing is changed to a predetermined interval, the intermittent reception timing generating unit 11 maintains the reception timing at the predetermined interval. The reference numeral 13 denotes a reception signal detecting unit for performing carrier detection, reception level detection, and the like to detect whether or not a reception signal has been input.

(Outline of an Operation of the Mobile Transmitter/Receiver 1)

A reception operation and a transmission operation of the mobile transmitter/receiver 1 will be described using FIG. 1.

In the case of transmission, the voice input from the voice inputting/outputting unit 10 (microphone or the like) is amplified by the controlling unit 8, and is modulated by the modulation unit 15. Thereafter, the modulated signal is converted into a high-frequency signal by the transmission frequency converting unit 5, and the electric power of the high-frequency signal is amplified by the electric power amplifying unit 4. Then, the amplified signal is transmitted from the antenna 2 to another mobile transmitter/receiver 1 via the antenna switch (the shared device) 3.

In the case of reception, a radio signal from another mobile transmitter/receiver 1 or the like is received by the antenna 2, and the frequency thereof is amplified by the high-frequency signal amplifying unit 6 of the reception unit via the antenna switch 3 to be converted into an intermediate-frequency signal by the reception frequency converting unit 7. A frequency-converted signal 24 is transmitted to the demodulation unit 14, and data are demodulated. A demodulated signal 25 from the demodulation unit 14 is processed into a voice signal, or the voice thereof is amplified by the controlling unit 8 to be output to the voice inputting/outputting unit 10 (speaker or the like).

(Configuration of the Intermittent Reception Timing Generating Unit 11)

Figure 2:
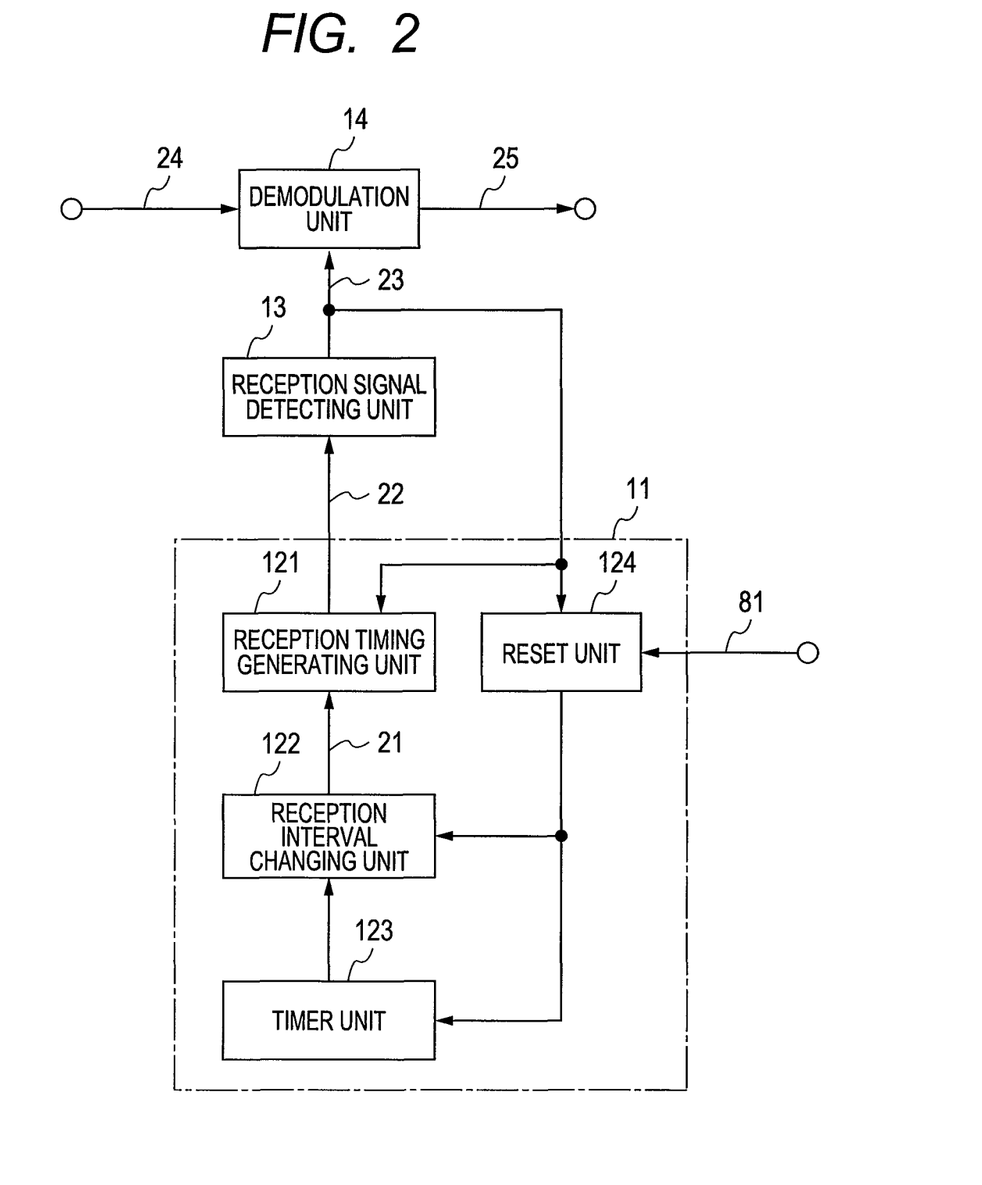
FIG. 2 is a diagram for showing a configuration block example of an intermittent reception timing generating unit 11 of the present invention.

A configuration of the intermittent reception timing generating unit 11 according to the embodiment will be described using FIG. 2. FIG. 2 is a diagram for showing a configuration block example of the intermittent reception timing generating unit 11 of the present invention. The reference numeral 121 denotes a reception timing generating unit for generating a reception timing signal 22 on the basis of an intermittent timing signal 21 from a reception interval changing unit 122 to be described later. The reference numeral 122 denotes the reception interval changing unit for setting and changing the interval of a receivable reception timing. In the embodiment, the interval of the intermittent timing signal 21 is changed for each reception timing in accordance with the number of times of outputting the intermittent timing signal 21. Further, when the interval of the intermittent timing signal 21 reaches a predetermined value, the reception interval changing unit 122 maintains the value as the interval of the intermittent timing signal 21 thereafter.

The reference numeral 123 denotes a timer unit (time measuring unit) for measuring an elapsed time after completion of reception or completion of transmission. The reference numeral 124 denotes a reset unit for performing processes such as initializing the reception timing generating unit 121, the reception interval changing unit 122, and the timer unit 123 on the basis of a signal 81 from the controlling unit 8. The signal 81 from the controlling unit 8 includes a standard timing signal 32, a reset signal 31, and a transmission timing signal 26 to be described later.

(Outline of an Operation of the Intermittent Reception Timing Generating Unit 11)

Figure 3:
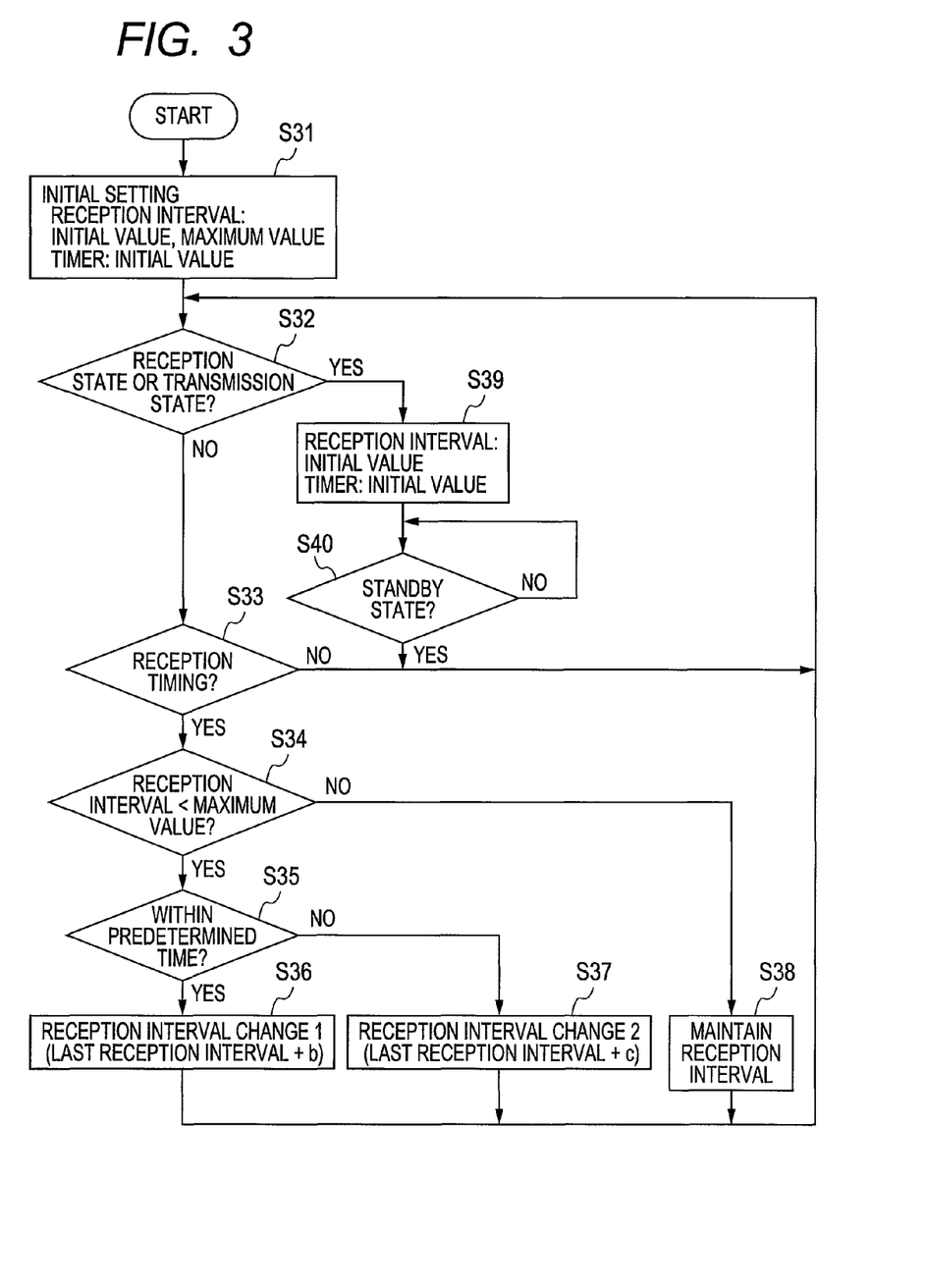
FIG. 3 is a flowchart for showing an example of generating an intermittent reception timing of the present invention.

An outline of an operation of the intermittent reception timing generating unit 11 of the embodiment will be described using FIG. 3. FIG. 3 is a flowchart for showing an outline of an operation of the intermittent reception timing generating unit 11 of the embodiment.

In the first place, initial setting is automatically performed when the electric power of the mobile station 1 is turned on in Step S31. In the initial setting, a reception interval is set at an initial value d, and a maximum value e of the reception interval is set. In addition, an initial value of the timer unit 123 is set. Next, it is judged in Step S32 whether or not the mobile station 1 is in a reception state or a transmission state. In the case where the mobile station 1 is in a reception state or a transmission state (Yes in Step S32), the reception interval and the timer are set at initial values in Step S39, and then, it is judged in Step S40 whether or not the mobile station 1 is in a standby state. A standby state is a state other than a reception state or a transmission state. In the case where the mobile station 1 is not in a standby state (No in Step S40), the mobile station 1 waits until it becomes a standby state. When the mobile station 1 becomes a standby state (Yes in the Step S40), the flow returns to Step S32 to judge whether or not the mobile station 1 is in a reception state or a transmission state.

In the case where the mobile station 1 is not in a reception state or a transmission state in Step S32 (No in Step S32), it is judged whether or not it is the receivable reception timing in Step S33. In the case where it is not the reception timing (No in Step S33), the flow returns to Step S32. In the case where it is the reception timing (Yes in Step S33), it is judged in Step S34 whether or not the current reception interval is smaller than the maximum value e. The maximum value e is initially set in Step S31. In the case where the current reception interval is not smaller than the maximum value e (No in Step S34), namely, in the case where the current reception interval corresponds to the maximum value e, the next reception interval is maintained at the same value as the current reception interval in Step S38, and then, the flow returns to Step S32.

In the case where the current reception interval is smaller than the maximum value e in Step S34 (Yes in Step S34), it is judged in Step S35 whether or not an elapsed time after completion of reception or completion of transmission is within a predetermined time. In the case where an elapsed time after completion of reception or completion of transmission is within a predetermined time (Yes in Step S35), a first reception interval changing process is performed in Step S36. In the first reception interval changing process, a time obtained by adding a predetermined first time b to the last reception interval of the reception timing is used as the next reception interval. After Step S36, the flow returns to Step S37.

In the case where an elapsed time after completion of reception or completion of transmission is not within a predetermined time in Step S35 (No in Step S35), a second reception interval changing process is performed in Step S37. In the second reception interval changing process, a time obtained by adding a predetermined second time c to the last reception interval of the reception timing is used as the next reception interval. After Step S37, the flow returns to Step S32.

In the embodiment, b is smaller than c. Thus, in the case of a standby state immediately after transmission, namely, in the case where there is a high possibility that a response from the counterpart is returned, the interval of the intermittent reception becomes shorter. In the case where a certain period of time passes without any response from the counterpart and there is a low possibility that a response from the counterpart is returned, the interval of the intermittent reception becomes longer.

(Detailed Configuration of the Intermittent Reception Timing Generating Unit 11)

Figure 4:
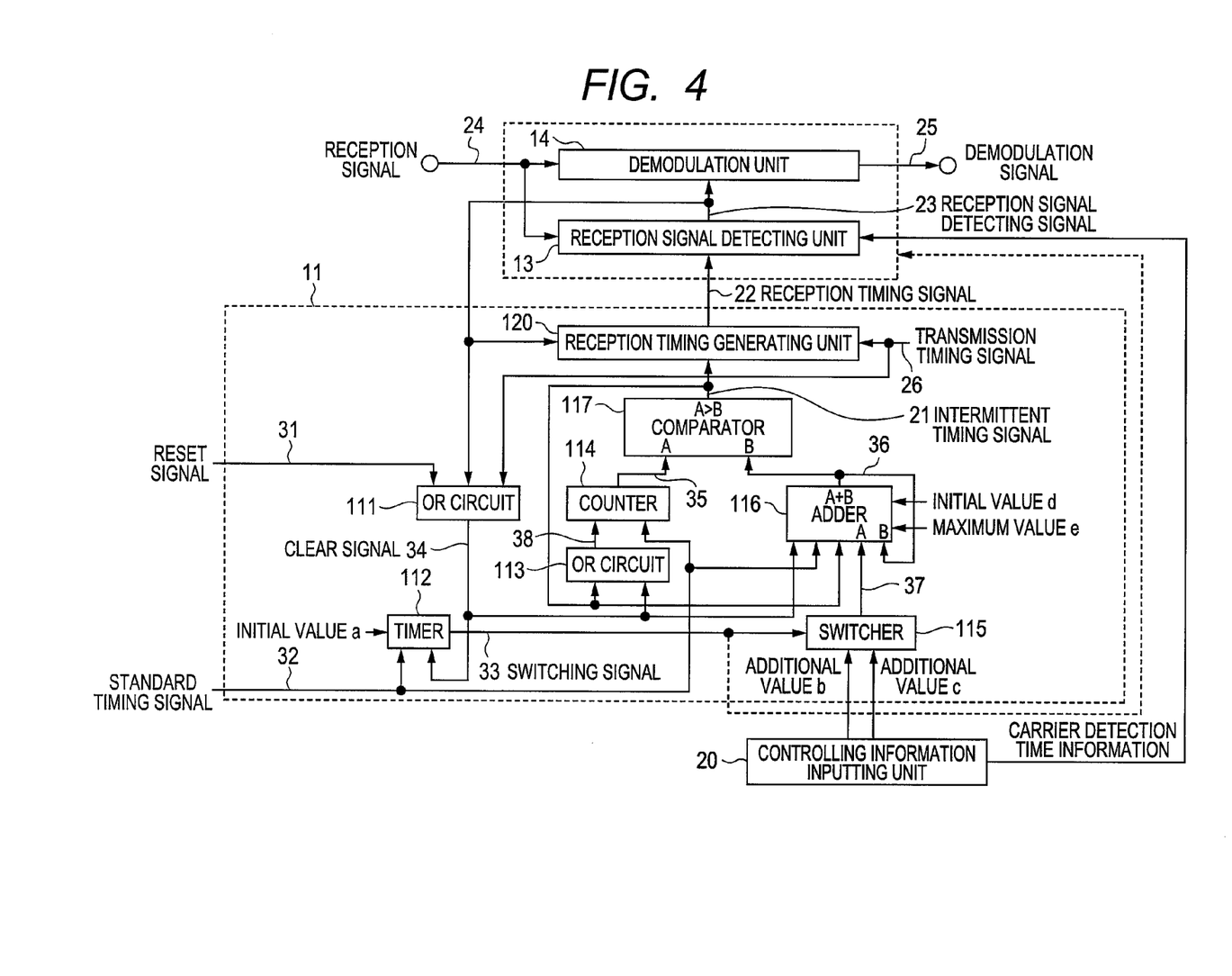
FIG. 4 is a diagram for showing a detailed configuration example of the intermittent reception timing generating unit 11 of the present invention.

A detailed configuration of the intermittent reception timing generating unit 11 will be described using FIG. 4. FIG. 4 is a diagram for showing a detailed configuration example of the intermittent reception timing generating unit 11 of the present invention. In FIG. 4, the intermittent reception timing generating unit 11 is realized by using a hardware circuit.

The intermittent reception timing generating unit 11 includes an OR circuit 111, a timer 112, an OR circuit 113, a counter 114, a switcher 115, an adder 116, a comparator 117, a reception timing generating unit 120, and a controlling information inputting unit 20.

The OR circuit 111 outputs a clear signal 34 when any one of the reset signal 31 from the controlling unit 8, a reception signal detecting signal 23 from the reception signal detecting unit 13, and the transmission timing signal 26 from the controlling unit 8 is input.

The timer 112 whose value a is set with the clear signal 34 counts down (−1) with the standard timing signal 32 generated at a constant interval, and outputs a switching signal 33 when the value of the timer becomes 0.

The OR circuit 113 outputs an enable signal 38 to the counter 114 when either of the intermittent timing signal 21 and the clear signal 34 is input.

The counter 114 clears the value of the counter with the enable signal 38 output from the OR circuit 113, and counts up (+1) with the standard timing signal 32 generated at a constant interval, and outputs the value as an output signal 35.

The switcher 115 outputs an additional value b when the switching signal 33 from the timer 112 is not input, and outputs an additional value c when the switching signal 33 is input.

The adder 116 sets an output of an added value 36 as the initial value d with the clear signal 34, adds values input to inputs A and B at the timing of the intermittent timing signal 21, and outputs the output signal of the added value 36. In addition, the output of the added value 36 is coupled to the input B.

The comparator 117 compares the values input to inputs A and B, and outputs the intermittent timing signal 21 when the input A is larger than the input B. The counter 114, the switcher 115, the adder 116, the comparator 117, and the like configure the reception interval changing unit 122.

The controlling information inputting unit 20 collects temporal parameters of an intermittent reception system from the inside and outside of the mobile transmitter/receiver 1, and outputs carrier detection time information by which a carrier detection time is set to the reception signal detecting unit 13. In addition, the controlling information inputting unit 20 outputs information of the additional value b and the additional value c by which the interval of the intermittent reception is set to the switcher 115 in the intermittent reception timing generating unit 11 as set values.

An operator of the mobile transmitter/receiver 1 can input the parameters such as the carrier detection time information and information of the additional value b and the additional value c by which the interval of the intermittent reception is set to the mobile transmitter/receiver 1 by using inputting means such as buttons of the display operation unit 9. The set value to be input may be a direct number or an indirect value such a command. The input set value is stored into holding means (memory) such as a storing element of the controlling unit 8 via a transmission path. The set value may be held only for a period when the electric power of the mobile transmitter/receiver 1 is turned on. Alternatively, the set value may be stored into a nonvolatile memory or the like to be held even when the electric power of the mobile transmitter/receiver 1 is not turned on. The parameters which can freely set the interval of the intermittent reception and the like can be set and controlled through various means such as inputting means such as buttons or a volume controller of the display operation unit 9, or a PC (personal computer) or a network.

The controlling information inputting unit 20 reads and uses the set value set by an operator from the holding means (memory) such as the storing element of the controlling unit 8. The parameters may be read when the initial setting is performed at the time of turning on the electric power, when the parameters are changed, or at a timing dependent on the operation of the controlling information inputting unit 20 unless the timing interferes with the operation of the intermittent reception.

(Operation of the Intermittent Reception Timing Generating Unit 11)

Figure 5:
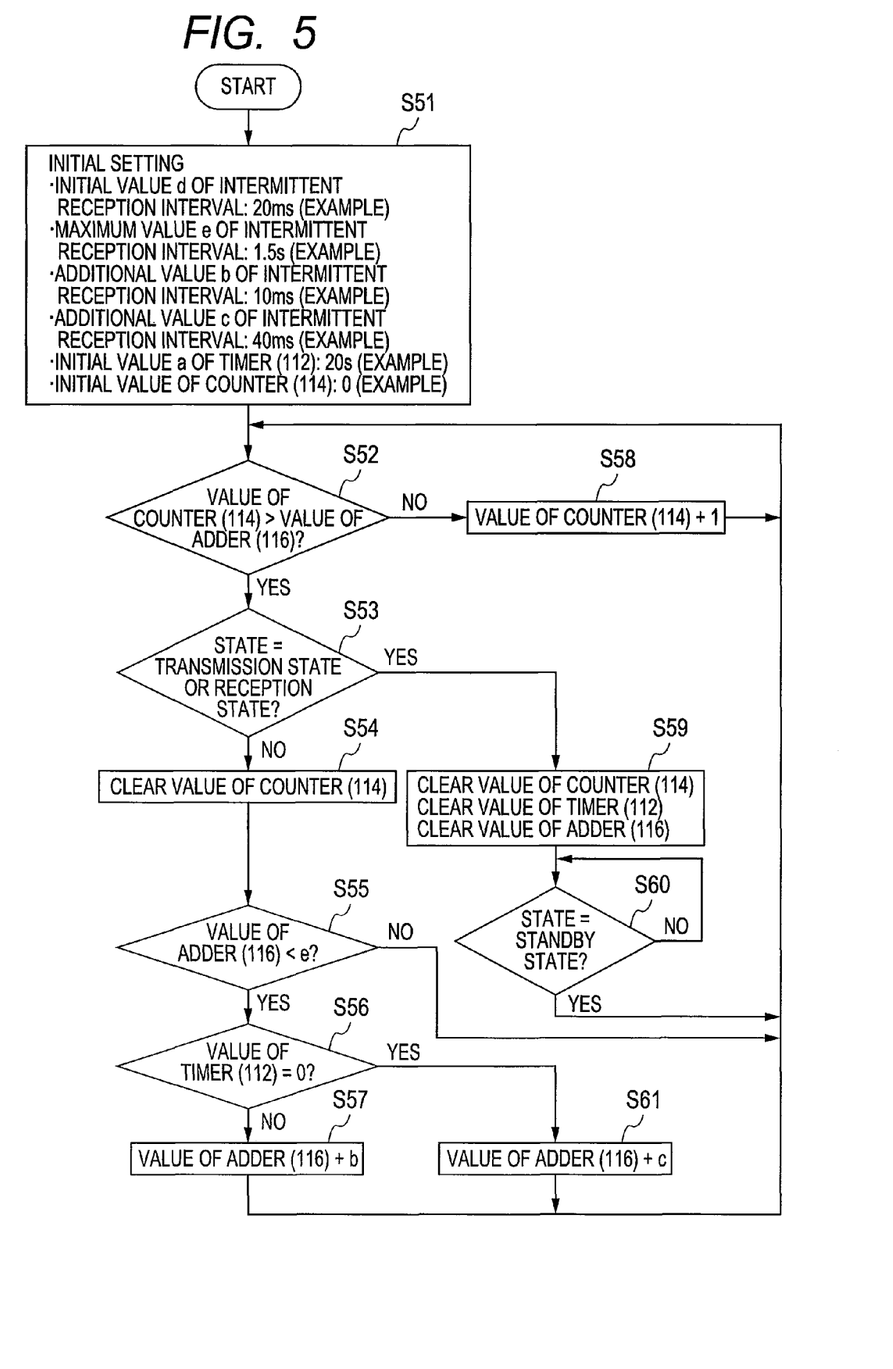
FIG. 5 is a flowchart for showing an example of generating the intermittent reception timing in the detailed configuration example in FIG. 4.

Next, an operation of the intermittent reception timing generating unit 11 of FIG. 4 will be described using FIG. 5. FIG. 5 is a flowchart for showing an operation of the intermittent reception timing generating unit 11 of FIG. 4.

In the first place, initial setting is automatically performed in Step S51 after the electric power of the mobile station 1 is turned on. In the initial setting, the reception interval is set at the initial value d, for example, 20 ms, the maximum value e of the reception interval is set at, for example, 1.5 s, the first additional value b of the reception interval is set at, for example, 10 ms, and the second additional value c of the reception interval is set at, for example, 40 ms. Further, the set value a of the timer 112 is set at, for example, 20 s, and the counter 114 is set at 0 as the initial value.

It should be noted that the initial value d and the maximum value e of the reception interval, the additional values b and c of the reception interval, the set value a of the timer 112, and the like are preliminarily input by an operator from the display operation unit 9, and are stored into the memory of the controlling unit 8 via the controlling information inputting unit 20. The initial setting is performed in Step S51 using the set values stored into the memory. The initial value d and the maximum value e of the reception interval, the additional values b and c of the reception interval, the set value a of the timer 112, and the like can be appropriately changed by an operator.

Next, it is judged by the comparator 117 in Step S52 whether or not the value of the counter 114 (output signal 35) is larger than the added value of the adder 116 (output 36). The counter 114 counts up with the standard timing signal 32. Further, the initial value of the adder 116 corresponds to the initial value d of the reception interval, and the output signal of the added value 36 represents the reception interval. That is, it is judged in Step S52 whether or not the mobile station 1 is in the receivable reception timing. In the case where the mobile station 1 is not in the reception timing (No in Step S52), 1 is added to the value of the counter 114 in Step S58, and the flow returns to Step S52.

In the case where the value of the counter 114 (output signal 35) is larger than the added value of the adder 116 (output 36) in Step S52 (Yes in Step S52), namely, in the case where the mobile station 1 is in the reception timing, it is judged in Step S53 whether or not the mobile station 1 is in a reception state or a transmission state. In the case where the mobile station 1 is in a reception state or a transmission state (Yes in Step S53), the value of the counter 114, the value of the timer 112 and the output of the added value 36 of the adder 116 are cleared in Step S59. Thereafter, it is judged in Step S60 whether or not the mobile station 1 is in a standby state. In the case where the mobile station is not in a standby state (No in Step S60), the mobile station 1 waits until it becomes a standby state. When the mobile station 1 becomes a standby state (Yes in Step S60), the flow returns to Step S52.

In the case where the mobile station 1 is not in a reception state or a transmission state in Step S53 (No in Step S53), the value of the counter 114 is cleared in Step S54. Thereafter, it is judged in Step S55 whether or not the output of the added value 36 of the adder 116 that is the current reception interval is smaller than the maximum value e of the adder 116. In the case where the output of the added value 36 of the adder 116 is not smaller than the maximum value e (No in Step S55), namely, in the case where the output of the added value 36 corresponds to the maximum value e, the flow returns to Step S52 without performing any process. That is, the next reception interval is maintained at the same value as the current reception interval.

In the case where the output of the added value 36 of the adder 116 is smaller than the maximum value e of the adder 116 in Step S55 (Yes in Step S55), it is judged in Step S56 whether or not the value of the timer 112 is 0, namely, whether or not an elapsed time after completion of reception or completion of transmission is within a predetermined time. In the case where the value of the timer 112 is 0, the switching signal 33 is output from the timer 112. The switcher 117 outputs the additional value b when the switching signal 33 is present, and outputs the additional value c when the switching signal 33 is not present.

In the case where the value of the timer 112 is not 0 in Step S56 (No in Step S56), namely, in the case where an elapsed time after completion of reception or completion of transmission is within a predetermined time, b is added to the output of the added value 36 of the adder 116 in Step S57. Accordingly, the next reception interval can be obtained by adding b to the current reception interval. Thereafter, the flow returns to Step S52.

Further, in the case where the value of the timer 112 is 0 in Step S56 (Yes in Step S56), namely, in the case where an elapsed time after completion of reception or completion of transmission is not within a predetermined time, c is added to the output of the added value 36 of the adder 116 in Step S61. Accordingly, the next reception interval can be obtained by adding c to the current reception interval. Thereafter, the flow returns to Step S52.

(Timing Chart of the Intermittent Reception Timing Generating Unit 11)

Next, a timing chart of the intermittent reception timing generating unit 11 of FIG. 4 will be described using FIGS. 4, 6, 7, 8, and 9.

Figure 6:
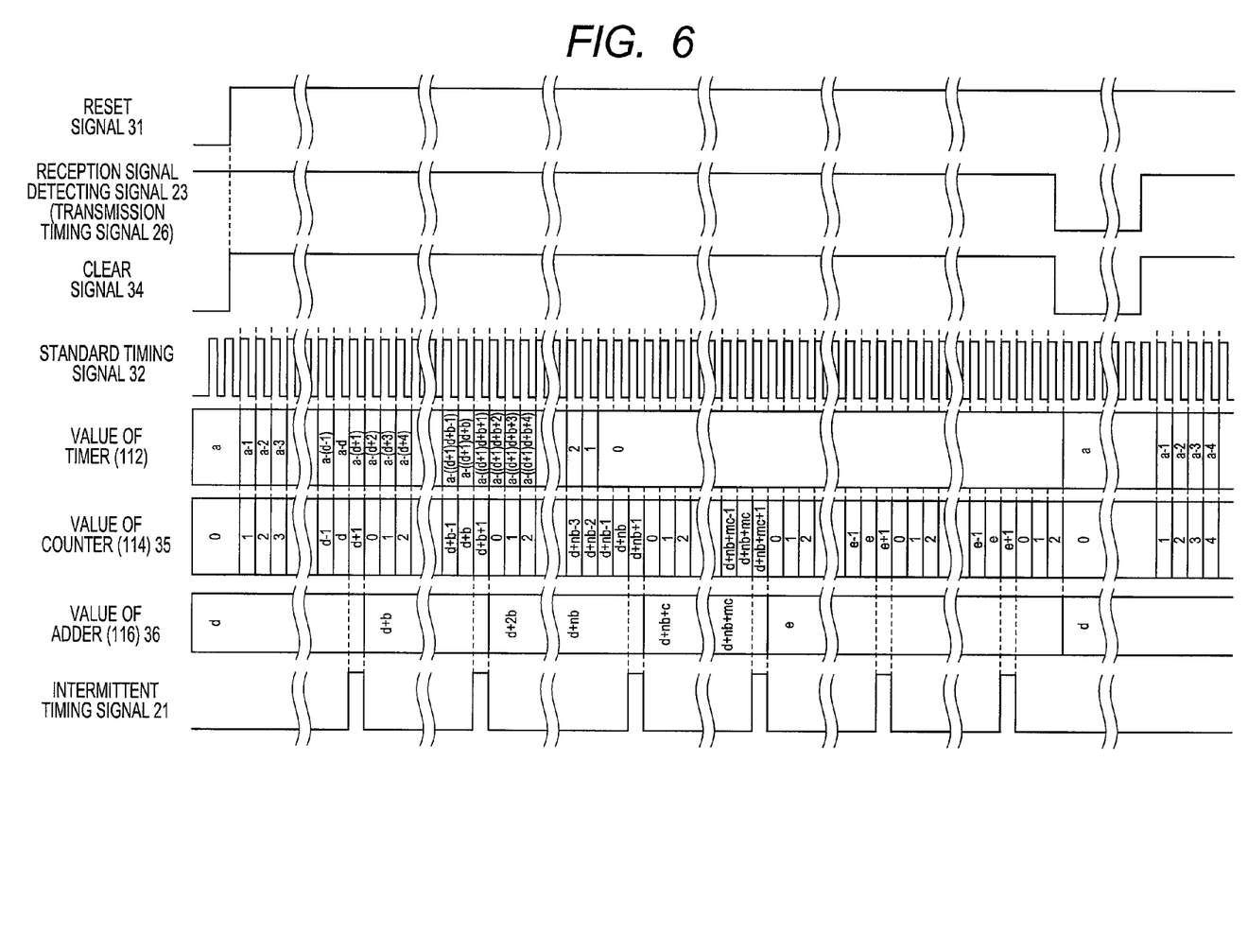
FIG. 6 shows a timing chart in the detailed configuration example in FIG. 4.

In the first place, a process of generating the intermittent timing signal 21 will be described using FIGS. 4 and 6. FIG. 6 is a timing chart for showing a process of generating the intermittent timing signal 21. As shown in FIGS. 4 and 6, the reset signal 31 generated by the controlling unit 8 at the time of turning on the electric power is input to the OR circuit 111, and is output as the clear signal 34. In a state where the clear signal 34 is input to the counter 114 through the OR circuit 113, the value of the counter 114 is cleared to 0 at the timing (the timing of each rising edge in FIG. 6) of the standard timing signal 32 generated at a constant interval. The value '0' of the counter is output to the input A of the comparator 117.

As similar to the above, the initial value 'd' is set as the output of the added value 36 of the adder 116 with the clear signal 34, and is input to the input B of the comparator 117. The input A ('0' as the value of the counter 35 from the counter 114) is compared with the input B ('d' as the added value 36 from the adder 116) by the comparator 117. In the case where the input A is larger than the input B, the intermittent timing signal 21 is output. In the case where the input A is equal to or smaller than the input B, the intermittent timing signal 21 is not output. Since the input B (added value 'd') is larger than the input A (the value '0' of the counter) at this time, the intermittent timing signal 21 is not output.

Next, the value of the counter 35 is counted up by the counter 114 from '0' to '1' at the timing (the timing of each rising edge in FIG. 6) of the standard timing signal 32, and '1' as the value of the counter 35 is compared with 'd' as the added value 36 from the adder 116 by the comparator 117. Since the added value 'd' is larger also in this case, the intermittent timing signal is not output. As described above, the value of the counter 35 is counted up to 2, 3, 4 and the like by the counter 114 at the timing of the standard timing signal 32. When the value of the counter 35 becomes larger than 'd' as the added value 36, the intermittent timing signal 21 is output from the comparator 117.

When the intermittent timing signal 21 is output, the value of the counter 35 is cleared to '0' in the counter 114 with the intermittent timing signal 21. Further, the input B (initial value 'd') is added to the input A (additional value 'b' output from the switcher 115) by the adder 116, and an added value 'd+b' is output.

By repeating the above-described set of operations, the interval of the intermittent timing signal 21 is increased by the additional value 'b' of the counter time in the counter 114 every time the intermittent timing signal 21 is generated. Further, when the added value 36 reaches the maximum value 'e' in the adder 116 and becomes constant, the interval of the intermittent timing signal 21 becomes constant.

Further, the intermittent reception timing generating unit 11 of FIG. 4 outputs the switching signal 33 after a period of time set with the value of the timer 'a' in the timer 112. When the switching signal 33 is input to the switcher 115, the switcher 115 switches an output 37 to the adder 116 from 'b' to 'c'. Accordingly, in the case where b is smaller than c, the increased time (b) of the interval of the intermittent timing signal 21 can be made smaller at an initial stage, and the increased time (c) can be made larger after a while.

Figure 7:
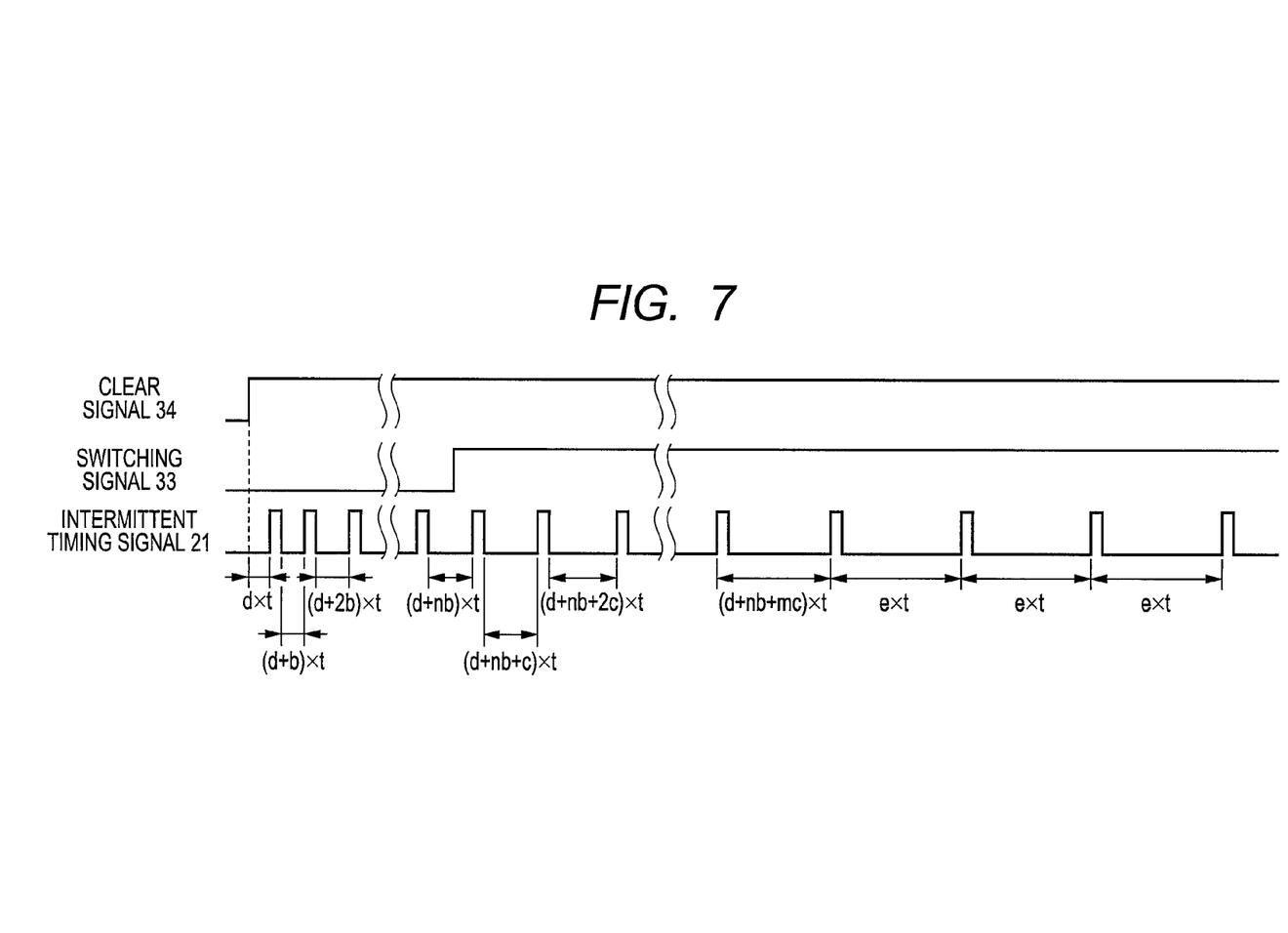
FIG. 7 shows a timing chart in the detailed configuration example in FIG. 4.

A relation between the switching signal 33 and the intermittent timing signal 21 will be described using FIG. 7. FIG. 7 is a timing chart of the intermittent timing signal 21. The interval time of the intermittent timing signal 21 is increased from d×t to (d+b)×t, (d+2b)×t, and (d+3b)×t on the assumption that the interval of the standard timing signal 32 is t (sec). When the switching signal 33 is output from the timer 112 after a while, the increased amount of the intermittent time is changed from b to c such as (d+nb+c)×t, (d+nb+2c)×t, and (d+nb+3c)×t. When d+nb+(m+1)c>e is satisfied after a while, the interval time is thereafter fixed at e×t.

Figure 8:
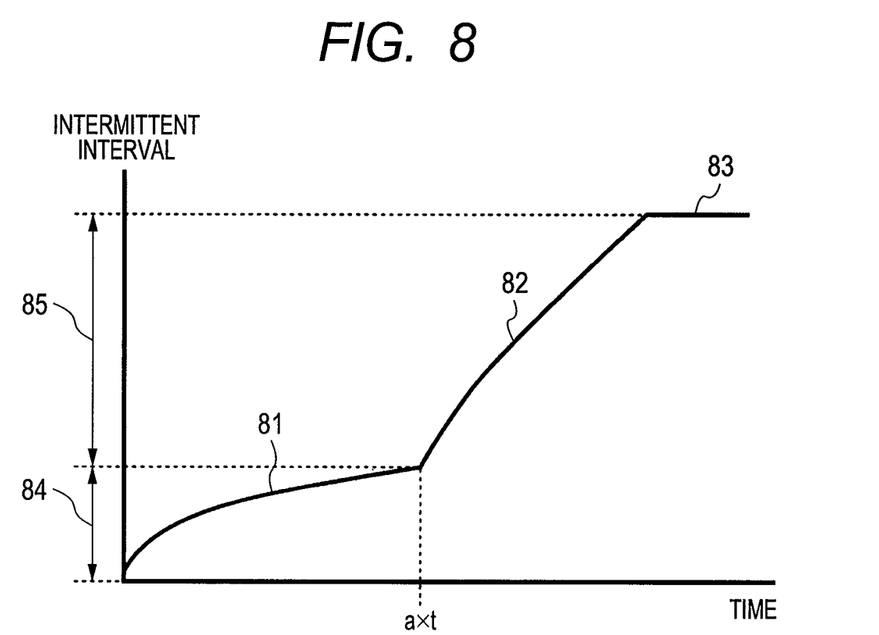
FIG. 8 shows a graph of a relation between a time and an intermittent interval in the configuration example of the present invention.

FIG. 8 is a graph for showing the interval of the intermittent timing signal 21 in the case of b<c. In FIG. 8, the horizontal axis represents an elapsed time and the vertical axis represents the interval of the intermittent timing signal 21.

In FIG. 8, the time when the increased intermittent interval (the interval of the intermittent timing signal 21) time is changed from b to c is represented by a×t (sec) because the set value of the timer 112 is a.

In FIG. 8, the reference numeral 81 shows a case where the increased intermittent interval time is b. The reference numeral 82 shows a case where the increased intermittent interval time is c. The reference numeral 83 shows a case where the intermittent interval time is fixed. As a concrete example, a×t that is the time when the increased intermittent interval time is changed from b to c can be set at 20 s, the intermittent interval time at a×t can be set at 600 ms, the time (time shifted from 82 to 83) at which the intermittent interval time is fixed can be set at about 40 s, and the intermittent interval time when the intermittent interval time is fixed can be set at about 1400 ms. It can be understood that the degree of increasing the interval of the intermittent timing signal 21 is larger in 82 than 81 because c is larger than b in the example of FIG. 8.

Because there is a high possibility that a response from the counterpart is returned in the case of a standby state immediately after transmission, b is smaller than c in the example of FIG. 8. When a certain period of time (a×t (sec) in the example) passes while no response is returned from the counterpart and there is a low possibility that a response from the counterpart is returned, the intermittent interval time is largely increased and the interval of the reception interval is made longer to enhance the power-saving effect. Provision of a certain amount of reception interval time or more interferes with a call to the counterpart. Accordingly, the intermittent interval time is made constant thereafter.

Here, in the case where the reception signal detecting unit 13 and the demodulation unit 14 are configured using processors such as DSPs (Digital Signal Processors), a pause mode or a function limiting mode is provided in the DSPs in many cases for the purpose of power saving. For example, a first pause mode is quickly returned to a normal processing mode. However, the first pause mode is large in power consumption and low in the power-saving effect. A second pause mode is slowly returned to the normal processing mode due to the necessity of rebooting. However, the second pause mode is small in power consumption and high in the power-saving effect. In the case where such a DSP is used, the mode that is quickly returned to the normal processing mode, but is low in the power-saving effect is used in a state where the interval of the intermittent reception is short, and the mode that is slowly returned to the normal processing mode, but is high in the power-saving effect is used in a state where the interval of the intermittent reception becomes long to some extent. As described above, the power saving modes can be appropriately used. The switching signal 33 output from the time 112 can be used as a timing when the mode is switched.

If the mobile station is configured to have the first pause mode and the second pause mode, the first pause mode that is quickly returned to the normal processing mode can be used in a standby mode immediately after transmission, namely, in a state where there is a high possibility that a response from the counterpart is returned. The second pause mode that is slowly returned to the normal processing mode can be used in state where a predetermined time passes. Accordingly, the mobile station can effectively make a response in a standby state.

Further, the first pause mode is used as a mode which restricts the function of the normal processing mode, and the second pause mode is used as a mode which restricts the function of the first pause mode and which is smaller in power consumption than the first pause mode. The first pause mode can be used in a standby mode immediately after transmission, namely, in a state where there is a high possibility that a response from the counterpart is returned. The second pause mode can be used in a state where a predetermined time passes.

With this configuration, the power consumption of the mobile station can be reduced by using the first pause mode which restricts the function of the normal processing mode in a standby mode immediately after transmission, namely, in a state where there is a high possibility that a response from the counterpart is returned, and by using the second pause mode which restricts the function of the first pause mode and which is smaller in power consumption than the first pause mode in a state where a predetermined time passes.

Figure 9:
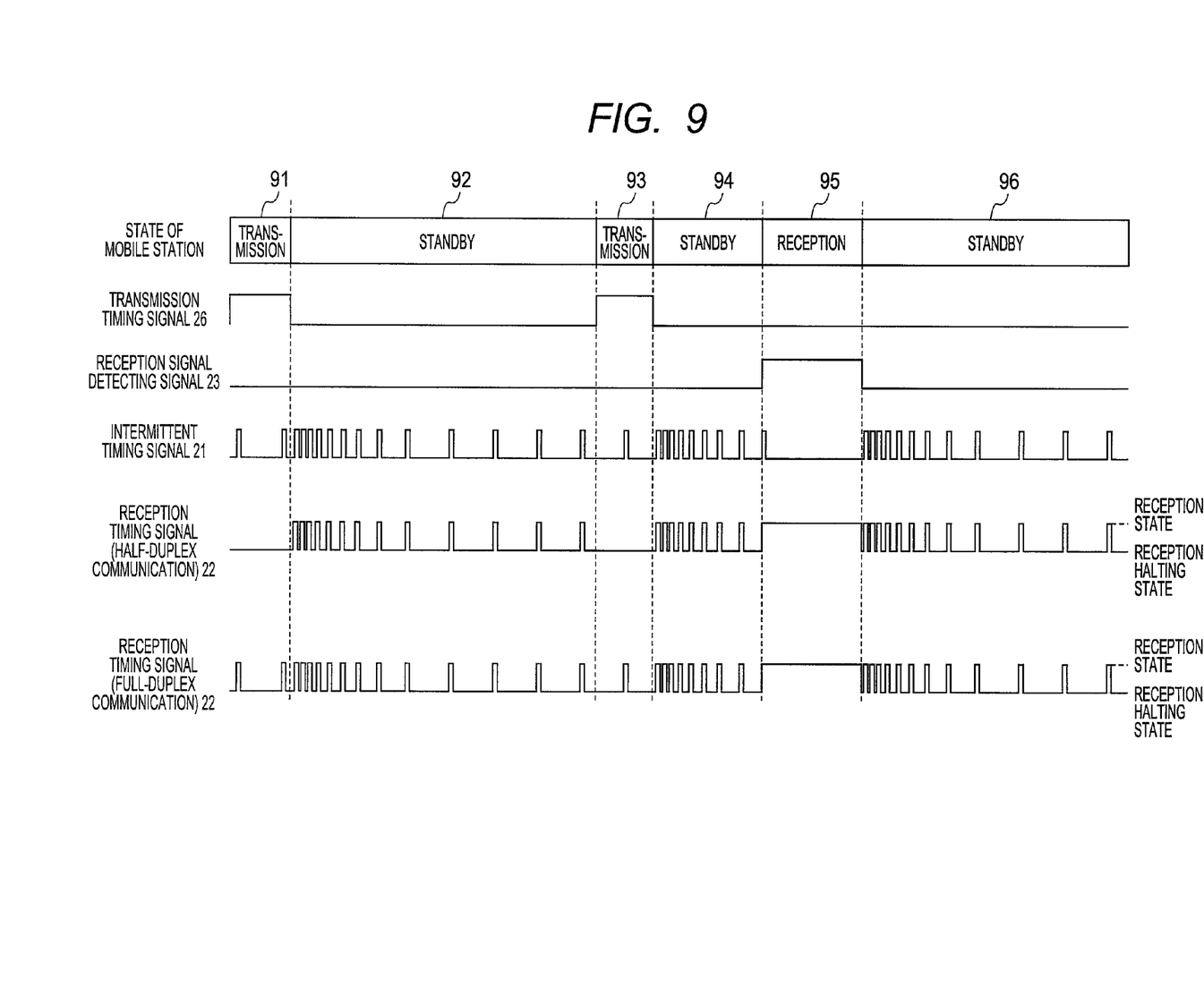
FIG. 9 shows a timing chart in the detailed configuration example in FIG. 4.

Next, states of the reception timing signal 22 in the transmission state, the standby state, and the reception state of the mobile station 1 will be described using FIG. 9. FIG. 9 is a timing chart in accordance with the transmission state, the standby state, and the reception state of the mobile station 1 in the detailed configuration example of FIG. 4. In FIG. 9, when the mobile station 1 becomes a standby state 92 after a transmission state 91, each interval of the reception timing signal 22 is gradually increased, and the interval becomes constant thereafter. Next, when the mobile station 1 becomes a transmission state 93, a transmission timing signal 26 on the basis of, for example, a transmission press signal in press talk communications is output from the controlling unit 8, and the clear signal 34 is accordingly output. In the case of half-duplex communications, outputting of the reception timing signal 22 is stopped. In the case of full-duplex communications, the reception timing signal 22 is continuously output. Next, when the mobile station 1 becomes a standby state 94, the reception timing signal 22 is output. Next, when the mobile station 1 becomes a reception state 95, the reception signal detecting signal 23 is output from the reception signal detecting unit 13, and the clear signal 34 is accordingly output. Thus, in the both cases of half-duplex communications and full-duplex communications, outputting of the reception timing signal 22 is stopped.

As shown in FIG. 4, the intermittent timing signal 21 output from the comparator 117 is output to the reception timing generating unit 120. The reception timing generating unit 120 outputs the intermittent timing signal 21 to the reception signal detecting unit 13 as the reception timing signal 22. At this time, as shown in FIG. 9, in the case where the mobile station is for the half-duplex communications, when the transmission timing signal 26 on the basis of, for example, a transmission press signal in press talk communications or the reception signal detecting signal 23 output from the reception signal detecting unit 13 is input to the reception timing generating unit 120, outputting of the reception timing signal 22 is stopped. In addition, in the case where the mobile station is for the full-duplex communications, when the reception signal detecting signal 23 output from the reception signal detecting unit 13 is input to the reception timing generating unit 120, outputting of the reception timing signal 22 is stopped irrespective of the transmission timing signal 26 such as a transmission press signal.

In the reception signal detecting unit 13, a reception signal detecting process such as a carrier detecting process and a reception level detecting process which is normally halted is started at the timing of the reception timing signal 22 from the intermittent reception timing generating unit 11. In the case where the reception signal 24 is detected at this time, the reception signal detecting signal 23 is output to the demodulation unit 14 during detection. Further, in the case where the reception signal 24 is not detected, the reception signal detecting process is halted again.

In the demodulation unit 14, the demodulation process of the reception signal which is normally halted is performed during a period when the reception signal detecting signal 23 from the reception signal detecting unit 13 is input, and the demodulation signal 25 is output.

It should be noted that the present invention can be provided as an apparatus, a method, and a system for executing the process according to the present invention, as a program for realizing such a method and a system, or as a recording medium on which the program is recorded. Further, in the embodiment, the intermittent reception timing generating unit 11 is configured by using hardware. However, the intermittent reception timing generating unit 11 may be configured by using a CPU (Central Processing Unit) and a memory. In this case, a program having the function of the intermittent reception timing generating unit 11 is stored on the memory, and the program is executed by the CPU.

Further, in the case where data communications are performed by a mobile system using the mobile station of the present invention, addition of dummy data corresponding to a maximum intermittent reception interval to the top of data can prevent the data from being not received, and data communications can be easily performed.

On the basis of the above description of the present invention, the following aspects of the present invention can be comprehended.

Specifically, according to the first aspect of the present invention, there is provided a mobile station including: a reception unit which receives a voice signal or a data signal transmitted from the outside; a transmission unit which transmits a voice signal or a data signal to the outside; and an intermittent reception timing generating unit which intermittently generates a receivable reception timing, wherein the intermittent reception timing generating unit includes: a reception interval changing unit which changes the interval of the receivable reception timing; a reception timing generating unit which generates a reception timing on the basis of the interval changed by the reception interval changing unit; and a timer unit which measures an elapsed time after completion of reception or completion of transmission, and the reception interval changing unit makes the interval of the reception timing long by a second time at every reception timing in a state where the elapsed time measured by the timer unit is within a first time, and makes the interval of the reception timing long by a third time at every reception timing in a state where the elapsed time is larger than the first time.

With such a configuration of the mobile station, the interval of the reception timing can be set in accordance with a state after completion of reception or completion of transmission, and the power consumption of the mobile station can be reduced while preventing interference with reception.

According to the second aspect of the present invention, in the mobile station according to the first aspect of the present invention, when the interval of the reception timing reaches a fourth time, the reception interval changing unit maintains the interval of the reception timing at the fourth time.

With such a configuration of the mobile station, it is possible to prevent the interval of the reception timing from being too long. Thus, the power consumption of the mobile station can be reduced without interference with reception.

According to the third aspect of the present invention, in the mobile station according to the first or second aspect of the present invention, the third time is longer than the second time.

With such a configuration of the mobile station, the responsiveness of the mobile station can be enhanced by making the interval of the reception timing short in a standby state or the like immediately after transmission, namely, in a state where there is a high possibility that a response from the counterpart is returned, and the power consumption of the mobile station can be reduced by increasing the degree of making the interval of the reception timing long in a state where a predetermined time (the first time) passes.

According to the fourth aspect of the present invention, in the mobile station according to the first to third aspects of the present invention, the reception unit is provided with a first pause mode which is quickly returned to a normal processing mode and a second pause mode which is slower in returning to the normal processing mode than the first pause mode, and the reception unit becomes the first pause mode in a state where the elapsed time is within the first time, and the reception unit becomes the second pause mode in a state where the elapsed time is larger than the first time.

With such a configuration of the mobile station, the first pause mode which is quickly returned to the normal processing mode can be set in a standby state or the like immediately after transmission, namely, in a state where there is a high possibility that a response from the counterpart is returned. The second pause mode which is slowly returned to the normal processing mode can be set in a state where a predetermined time (the first time) passes. Thus, a response can be effectively returned in a standby mode.

According to the fifth aspect of the present invention, in the mobile station according to the fourth aspect of the present invention, the second pause mode is smaller in power consumption than the first pause mode.

With such a configuration of the mobile station, the first pause mode can be set in a standby state or the like immediately after transmission, namely, in a state where there is a high possibility that a response from the counterpart is returned. The second pause mode with less power consumption can be set in a state where a predetermined time (the first time) passes. Thus, the power consumption of the mobile station can be reduced.

According to the sixth aspect of the present invention, in the mobile station according to the third aspect of the present invention, the reception unit is provided with the first pause mode which restricts the function of the normal processing mode and the second pause mode which further restricts the function of the first pause mode and which is smaller in power consumption than the first pause mode, and the reception unit becomes the first pause mode in a state where the elapsed time is within the first time, and the reception unit becomes the second pause mode in a state where the elapsed time is larger than the first time.

With such a configuration of the mobile station, the first pause mode which restricts the function of the normal processing mode can be set in a standby state or the like immediately after transmission, namely, in a state where there is a high possibility that a response from the counterpart is returned. The second pause mode which restricts the function of the first pause mode and which is smaller in power consumption than the first pause mode can be set in a state where a predetermined time (the first time) passes. Thus, the power consumption of the mobile station can be reduced.

According to the seventh aspect of the present invention, there is provided a mobile receiver including: a reception unit which receives a voice signal or a data signal transmitted from the outside; and an intermittent reception timing generating unit which intermittently generates a receivable reception timing, wherein the intermittent reception timing generating unit includes: a reception interval changing unit which changes the interval of the receivable reception timing; a reception timing generating unit which generates a reception timing on the basis of the interval changed by the reception interval changing unit; and a timer unit which measures an elapsed time after completion of reception, and the reception interval changing unit makes the interval of the reception timing long by a second time at every reception timing in the case where the elapsed time measured by the timer unit is within a first time, and makes the interval of the reception timing long by a third time at every reception timing in the case where the elapsed time is larger than the first time.

With such a configuration of the mobile receiver, the interval of the reception timing can be set in accordance with a state after completion of reception, and the power consumption of the mobile receiver can be reduced while preventing interference with reception.

According to the eighth aspect of the present invention, there is provided a voice-communication mobile station including: a reception unit which receives a voice signal transmitted from the outside; a transmission unit which transmits a voice signal to the outside; and an intermittent reception timing generating unit which intermittently generates a receivable reception timing, wherein the intermittent reception timing generating unit includes: a reception interval changing unit which changes the interval of the receivable reception timing; a reception timing generating unit which generates a reception timing on the basis of the interval changed by the reception interval changing unit; a timer unit which measures an elapsed time after completion of transmission of voice, and the reception interval changing unit sets the interval of the reception timing at a fifth time in the case where the elapsed time measured by the timer unit is within a first time, and sets the interval of the reception timing longer than the fifth time in the case where the elapsed time is larger than the first time.

With such a configuration of the mobile station, the responsiveness can be enhanced by shortening the interval of the reception timing in the case of a standby state immediately after transmission of voice, namely, in the case where there is a high possibility that a voice response from the counterpart is returned, and the power consumption of the mobile station can be reduced by making the interval of the reception timing long after a predetermined time (the first time) passes.

According to the ninth aspect of the present invention, there is provided a mobile station including: a reception unit which receives a voice signal or a data signal transmitted from the outside; a transmission unit which transmits a voice signal or a data signal to the outside; and an intermittent reception timing generating unit which intermittently generates a receivable reception timing, wherein the intermittent reception timing generating unit includes: a timer unit which measures an elapsed time after completion of reception or completion of transmission; a reception interval changing unit which changes the interval of the receivable reception timing on the basis of the elapsed time measured by the timer unit; and a reception timing generating unit which generates a reception timing on the basis of the interval changed by the reception interval changing unit, and the reception interval changing unit makes the interval of the reception timing long when the elapsed time measured by the timer unit exceeds a first time.

With such a configuration of the mobile station, the interval of the reception timing can be set in accordance with a state after completion of reception or completion of transmission, and the power consumption of the mobile station can be reduced while preventing interference with reception.

What is claimed is:
1. A mobile station comprising:
 a reception unit which receives a voice signal or a data signal transmitted from the outside;
 a transmission unit which transmits a voice signal or a data signal to the outside; and an intermittent reception timing generating unit which intermittently generates a receivable reception timing, wherein the intermittent reception timing generating unit includes:

a timer unit which measures an elapsed time after completion of reception or completion of transmission;

a reception interval changing unit which changes the interval of the receivable reception timing on the basis of the elapsed time measured by the timer unit; and a reception timing generating unit which generates a reception timing on the basis of the interval changed by the reception interval changing unit, and the reception interval changing unit makes the interval of the reception timing long when the elapsed time measured by the timer unit exceeds a first time, wherein the reception interval changing unit makes the interval of the reception timing long by a second time at every reception timing in a state where the elapsed time measured by the timer unit is within the first time, and makes the interval of the reception timing long by a third time at every reception timing in a state where the elapsed time is larger than the first time.

2. The mobile station according to claim 1, wherein when the interval of the reception timing reaches a fourth time, the reception interval changing unit maintains the interval of the reception timing at the fourth time.

3. The mobile station according to claim 2, wherein the third time is longer than the second time.

4. The mobile station according to claim 3, wherein the reception unit is provided with a first pause mode which is quickly returned to a normal processing mode and a second pause mode which is slower in returning to the normal processing mode than the first pause mode, and the reception unit becomes the first pause mode in a state where the elapsed time is within the first time, and the reception unit becomes the second pause mode in a state where the elapsed time is larger than the first time.

5. The mobile station according to claim 4, wherein the second pause mode is smaller in power consumption than the first pause mode.

6. The mobile station according to claim 3, wherein the reception unit is provided with the first pause mode which restricts the function of the normal processing mode and the second pause mode which further restricts the function of the first pause mode and which is smaller in power consumption than the first pause mode, and the reception unit becomes the first pause mode in a state where the elapsed time is within the first time, and the reception unit becomes the second pause mode in a state where the elapsed time is larger than the first time.

7. A mobile receiver comprising:

a reception unit which receives a voice signal or a data signal transmitted from the outside; and an intermittent reception timing generating unit which intermittently generates a receivable reception timing, wherein intermittent reception timing generating unit includes:

a timer unit which measures an elapsed time after completion of reception;

a reception interval changing unit which changes the interval of the receivable reception timing on the basis of the elapsed time measured by the timer unit; and a reception timing generating unit which generates a reception timing on the basis of the interval changed by the reception interval changing unit, and the reception interval changing unit makes the interval of the reception timing long when the elapsed time measured by the timer unit exceeds a first time, wherein the reception interval changing unit makes the interval of the reception timing long by a second time at every reception timing in a state where the elapsed time measured by the timer unit is within the first time, and makes the interval of the reception timing long by a third time at every reception timing in a state where the elapsed time is larger than the first time.

8. The mobile receiver according to claim 7, wherein when the interval of the reception timing reaches a fourth time, the reception interval changing unit maintains the interval of the reception timing at the fourth time.

9. The mobile receiver according to claim 8, wherein the third time is longer than the second time.

* * * * *